FIG. 7
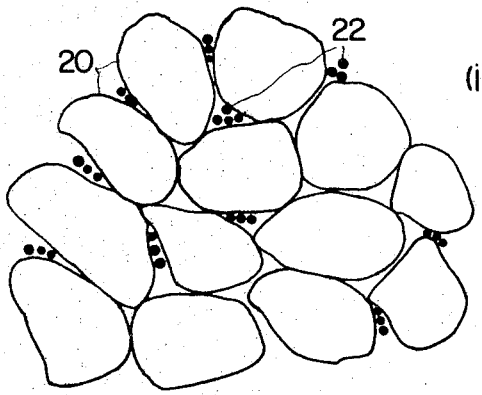
FIG. 10
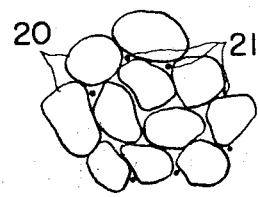
FIG. 11
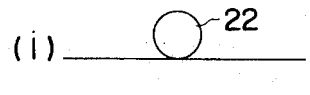
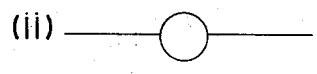
FIG. 12
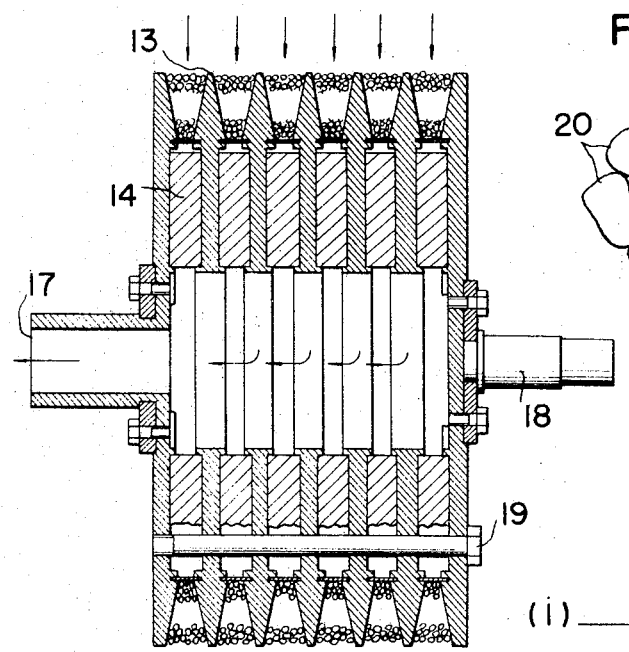

United States Patent Office 3,349,918
Patented Oct. 31, 1967

3,349,918
MAGNETIZABLE-PARTICLE TYPE FILTRATION APPARATUS CAPABLE OF PERFORMING CONTINUOUS FILTERING OPERATION
Yasuhiko Iki, Tokyo-to, Japan, assignor to Kiyohiko Iki, Tokyo-to, Japan
Filed Dec. 7, 1964, Ser. No. 416,295
Claims priority, application Japan, Dec. 13, 1963, 38/66,500; Jan. 30, 1964, 39/4,236; Feb. 3, 1964, 39/5,247
4 Claims. (Cl. 210—223)

This invention relates to fluid filtration apparatus of the type wherein magnetizable particles are used as filter elements. More particularly, the invention concerns a novel filtration apparatus developed as the result of study of the various aspects of the construction of the filtration apparatus (hereinafter referred to simply as "filter"), the cleaning of the filter element, and the economy of operation thereof, said study having been made from a new viewpoint with the object of eliminating various disadvantages accompanying existing fluid filters such as those in which diatomaceous earth, sintered metals, ceramics, sand, and other like materials are used.

The principal conditions necessary for attaining continuous filtration to separate out extremely fine particles in an economical manner are considered to be the following:

(1) Every particle of fine size of the filter element material must be supported in a manner to prevent its being swept away by liquid force.

For example, in a diatomaceous earth filter, this condition is satisfied by applying a pressure of from 3 to 5 kg./cm.$^2$ on the unfiltered liquid side to establish a bridging or arching effect; and in a sintered metal filter, this condition is fulfilled by sintering metal powder.

(2) Cleaning of the filter element material when its passageways become clogged must be easy.

Existing filters are completely inadequate with respect to this condition.

(3) The filtration pressure must be low.

It is a general object of the present invention to provide a filter which completely satisfies the foregoing conditions.

According to the present invention there is provided, in a filter of the type wherein an aggregate of a magnetizable material (including a magnetizable material containing non-magnetizable material admixed therein) supported between mutually inclined magnetic pole surfaces is used as the filter element material, means to wash one portion of said filter element material at a time, mechanically or by backwashing with liquid, thereby to make possible filtration by said filter in a continuous (or intermittent) manner.

The specific nature, principle, and details of the invention will be more clearly apparent by reference to the following description taken in conjunction with the accompanying drawings throughout which like parts are designated by like reference numerals, and in which:

FIG. 7 is a longitudinal sectional view of a filter element assembly according to the invention in which yokes are used and permanent magnets are installed internally;

FIG. 10 is a diagrammatic view showing fine interstices formed between particles of a filter element material;

FIG. 11 is a simplified view for describing the relationships of forces imparted by the state of fine interstices on a foreign particle;

FIG. 12 is a diagram illustrating a state of adsorption of foreign particles within fine interstices;

Figure 1:
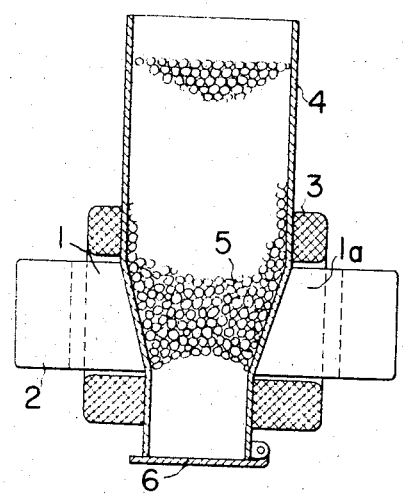
FIGS. 1 and 2 are respectively an elevational view and a plan view, both in section, of a device illustrating the fundamental principle of the filter of the invention.
Figure 2:
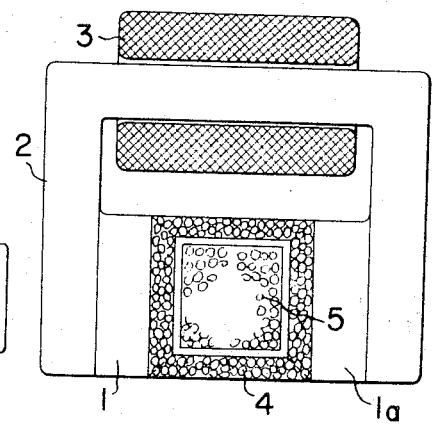

Referring first to FIGS. 1 and 2, the device shown therein comprises a casing 4 of non-magnetic material having a funnel-shaped lower part, magnetic poles 1 and $1_a$ disposed on mutually opposite sides of the funnel-shaped part of the casing 4 and having suitably inclined surfaces as shown, a yoke 2 connecting the N-S poles 1 and $1_a$, a magnet coil 3 wound about the yoke 2, and a bottom door 6 for the casing 4.

When the door 6 of the above described device is closed, the casing 4 is filled with sand 5 for common industrial use, the coil 3 is suitably energized, and then the door 6 is opened, the sand below the magnetic poles immediately drops, but the sand thereabove remains with a bottom surface forming an arch-shaped ceiling and does not drop.

Then, if the energizing current supplied to the coil 3 is shut off, the remaining sand will begin to fall, but if the current is again turned on, the falling of the sand will immediately stop. Consideration of the cause of this phenomenon leads to the following observation.

As is known, ordinary sand for common industrial use is composed for the most part of non-magnetic material and contains ordinarily a slight percentage of iron sand admixed therewith. The mean magnetic permeability of this sand is almost that of a non-magnetic material. It is evident, therefore, that direct magnetic attractive force, by itself, cannot support the sand in the upper part of the casing 4. For confirmation, experiments were carried out in an example wherein iron is removed from the sand and in another example wherein the magnetic poles were not provided with inclinations, whereupon it became apparent that the above described phenomenon does not occur in either case.

The above described phenomenon, which will hereinafter be called the "arch effect," is apparently due to the resultant effect of the three factors of (a) the inclination of the magnetic pole surfaces, (b) the state of filling of the sand, and (c) the magnetism. The cause and mechanism of this phenomenon will be further considered below since it has an important relation to the principle of the present invention.

Figure 3:
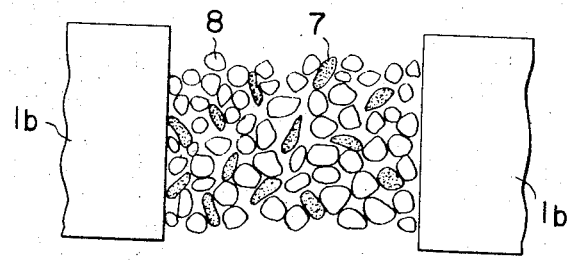
FIGS. 3 and 4 are diagrammatic views to be referred to in a following description of the arch effect which constitutes a principle of the invention.
Figure 4:
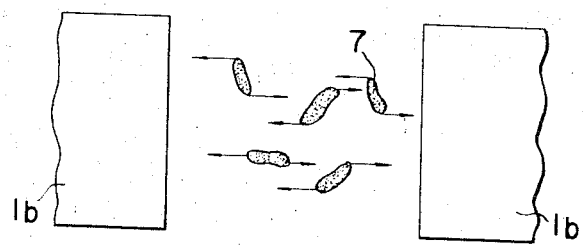

Referring to FIGS. 3 and 4, reference numeral 7 designates iron sand particles (black particles) within a body of sand, and numeral 8 designates non-magnetic particles (white particles), the body of sand being disposed between means $1_b$ to produce a magnetic field.

In the absence of a magnetic field, the iron sand particles are lying in entirely random directions, but when a magnetic field is applied, the iron sand particles are acted upon by forces as indicated in FIG. 4 tending to align the particles in the direction of increasing lines of magnetic force, thereby applying forces on the surrounding particles. Although each of these forces is extremely small, the aggregate body of all particles tends to expand and press against the surfaces of the magnetic field means $1_b$, thereby acting as a rigid integral structure with respect to a pressing force from above, in the manner of an arcuate brick or stone arch. However, since the distance involved in this expansion is infinitestimal, it is necessary to initially pack the sand with ample compaction firmness.

If, instead of the sand mentioned above, a body of particles of only iron sand is used, since the ratio of the permeabilities of sand and iron sand exceeds 1:100 even when the percentage of voids is considered, it will not be necessary to use a powerful electromagnet, a permanent magnet being sufficient.

The foregoing consideration leads to the conclusion that by providing means of an arrangement and construction such as to satisfy the above set forth conditions, it is possible to obtain economically a porous filter element material having a strength of the same order as that of sintered metal.

The manner in which the present invention, in an important aspect thereof, provides such means will be apparent from the following description with respect to two examples of practical arrangement and construction.

Figure 5:
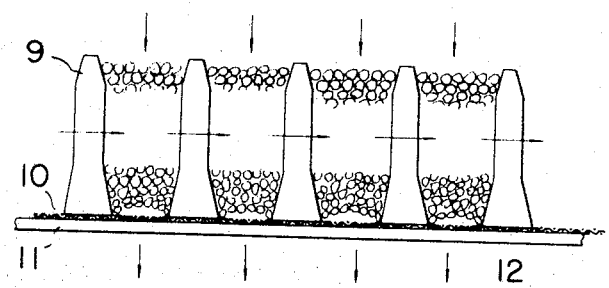
FIG. 5 is a fragmentary, elevational view, in section, showing one example of a filter in which the principle of the invention is utilized, permanent magnets being arranged in rows.
Figure 6:
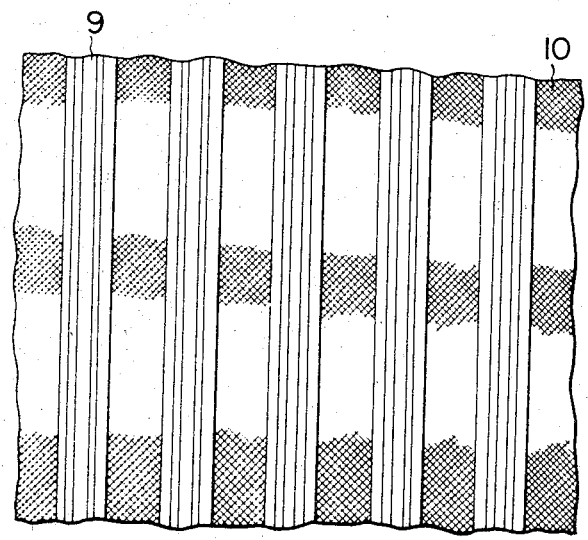
FIG. 6 is a fragmentary plan view corresponding to the example shown in FIG. 5.

Referring to FIGS. 5 and 6, the filter element structure shown comprises permanent magnets 9 disposed in substantially parallel arrangement and magnetized in the direction indicated by arrows, a layer 10 of a porous material such as nylon fabric or metal screen laid below the magnets 9, a porous plate 11 supporting the layer 10, and filter element material 12 (iron sand or iron powder) filling the spaces between the magnets 9. The fabric layer 10 is provided to prevent escape of filter material particles at the lowermost part of the body of filter material 12 at times when this material is not firmly compacted. When liquid pressure is applied, the filter material 12 automatically becomes compacted. The liquid to be filtered is introduced from above in the direction shown by the arrows to flow into the filter material and emerges at the bottom of the plate 11 as a filtrate. Depending on the nature of application, the filter element surface can be designed in various shapes such as planar and cylindrical shapes.

Figure 8:
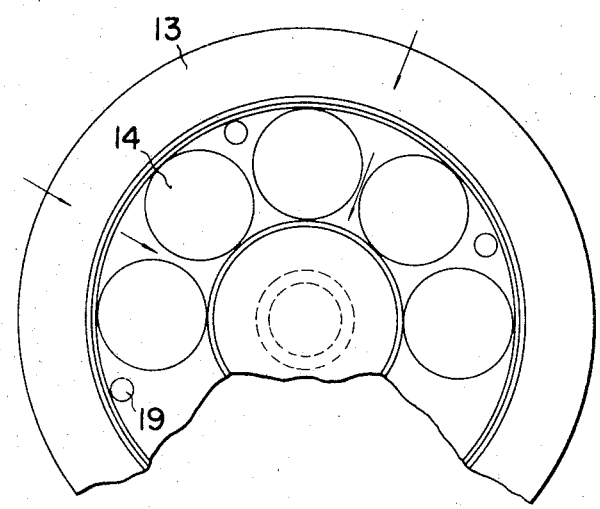
FIG. 8 is a partial end view in the axial direction of the element assembly shown in FIG. 7.
Figure 9:
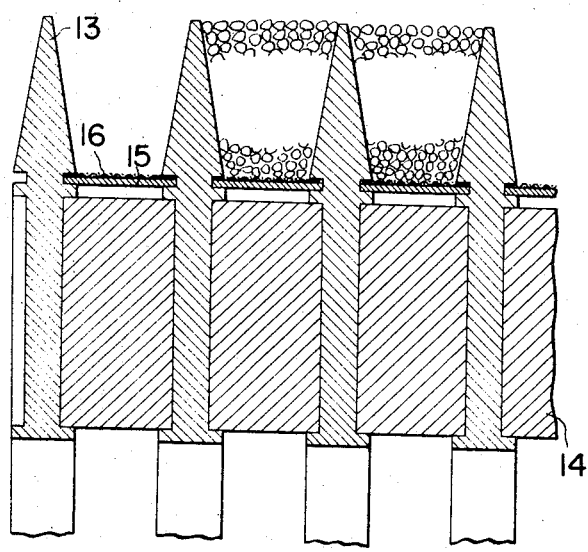
FIG. 9 is a fragmentary, enlarged view showing one part of the assembly as shown in FIG. 7.

In another embodiment of the invention as shown in FIGS. 7, 8 and 9, the filter element assembly is in the form of a rotor of cylindrical shape defined by a plurality of coaxial yoke disks 13, each having a peripheral part of convergently tapered cross section. Permanent magnets 14 are interposed between the yoke disks 13 at positions radially inward from said peripheral part and are encompassed by ring-shaped porous plates 15, FIG. 9, which are also interposed between the yoke disks 13 and support rings of nylon filter fabric 16 (which alternatively may be made of metal screen material). The yoke disks 13, with the magnets 14, porous plates 15, and nylon fabric 16 interposed therebetween, are held together by non-magnetic tie bolts 19 to form a cylindrical structure which is provided with a shaft end 17 serving doubly as a filtrate outlet and with an opposite shaft end 18.

Although the filter element assembly of the above described construction has the drawback of tending to be somewhat heavy, the volume and surface area of the permanent magnets to be installed therein can be increased independently of the filtration surface, whereby the magnetic field strength can be made amply high to permit the use of fine filter element material. Accordingly, this construction makes possible filtration of extremely fine suspended particles.

As mentioned briefly hereinbefore, the present invention, in another aspect thereof, provides a simple method and means for readily washing the filter element material. The filter according to the invention has the following advantageous features which facilitate this washing of the filter material:

(1) As mentioned hereinbefore, the resistance against the filtration pressure in the filter of this invention is not due to the attractive force of the magnetic field but is due to the resultant effect of the three factors of the magnetic field, filter element material, and the inclination of the magnetic pole surfaces. For this reason, the filter element material can be readily separated from the magnetic field by a mechanical force applied in a direction perpendicular to the direction of liquid pressure or flow due to downward flow of the liquid. That is, the filter element material functions as a porous solid with respect to filtration action and can be handled as a group of particles in dispersed state at the time of washing. This unique feature cannot be attained by sintered metal and diatomaceous earth filters.

(2) In the case of the filter of this invention, since the filter element material cannot drop off because of the magnetic field even when the filtration surface is facing in the downward direction, it is possible to use a filtration surface of cylindrical form and to wash successively each part of the cylindrical surface as the filter element assembly is rotated. This feature is unattainable by an ordinary sand filter.

(3) The mechanisms of filtration and washing in the filter of this invention may be considered to be as follows:

(a) Foreign particles of sizes of approximately 10 to 20 percent of the particle size (diameter) of the filter element material or larger size are almost completely intercepted on the surface of the filter element.

(b) Foreign particles of somewhat smaller sizes infiltrate into the filter element and are intercepted by the arch effect.

(c) Extremely fine foreign particles (of the order of a few microns or finer) are intercepted by adsorption action in the fine interstices between the particles of the filter element material.

This adsorption action is due to fine interstices 21 formed by the aggregate state of particles 20 of the filter element material as indicated in FIG. 10.

Differences due to the surface state of materials of adsorptivity are indicated in FIG. 11, in which state (i) represents the case of a simple plane surface, state (ii) represents the case of a surface with some indentation, and state (iii) represents the case of a deep hole. According to one source (Tamamushi, Bun-ichi: "Butsurigaku Kaimen Genshyo" ("Physical Interface Phenomena"), Iwanami Sho-ten, Tokyo), the corresponding adsorptivities are related according to the following ratio:

$$(i):(ii):(iii)=1:4:6$$

In the filter of this invention, state (iii) corresponds to the state at the time of filtration, and state (i) corresponds to that at the time of washing. It has been found in actual operation that the adsorption action is remarkably effective, apparently because of the formation of additional fine interstices by the intercepted foreign particles themselves.

(4) It has been found that a filtration pressure of the order of from 0.1 to 0.5 kg./cm.$^2$ is sufficient for practical operation of the filter according to the present invention. The reason for this is believed to be that, because of the differences in the shapes of the iron sand particles, the percentage of voids in the filter element material for operation is approximately 30 to 50 percent, and that the adsorptivity of iron sand is relatively high.

As a result of experiments it has been found that the adsorptivity of iron sand (of a particle size of the order of 300 microns) as used in the filter of this invention is approximately equal to that of activated charcoal in terms of volume ratio. The fact that a filtration pressure less than one atmosphere is sufficient is a highly advantageous feature of the present invention in the designing of a continuous filtration apparatus.

(5) Finally, the present invention affords utilization of a phenomenon which is important in the case where liquid is to be circulated for continuous filtration, and which will be described hereinbelow with respect to one example.

When waste water resulting from washing coal in a coal mine (said water having a brown black colour) is filtered by means of the filter of this invention, and the foreign particles entrapped in the filter element are taken out together with the filter element material and washed with clean water, the resulting water so used for cleaning again assumes a turbid appearance. However, whereas the suspended material in the original water required one week or longer for complete settling to the bottom of a test tube, the particles once intercepted in the filter element material settles in from 1 to 2 hours. Furthermore, when filtration of the original water and of the water used for washing the filter element is attempted with filter paper under the same conditions, most of the foreign particles in the former pass through the filter paper, but almost all of the particles in the latter do not pass through the filter paper. This phenomenon is observed not only in the case of water but also in similar treatment of a paint thinner in which paint has been dissolved.

The cause of this phenomenon, briefly stated, is apparently that the foreign particles are successively adsorbed in multiple layers in the fine interstices between the filter material particles as indicated in FIG. 12 and are caused by the Van der Waals forces to cohere with one another.

Because of this phenomenon, when the wash liquid is returned to the filter tank, the particles settle rapidly and do not interfere with the filtration.

By appropriately utilizing the five features described above, it is possible to design a filter capable of accomplishing continuous filtration, as illustrated by the following specific examples of the invention.

Figure 13:
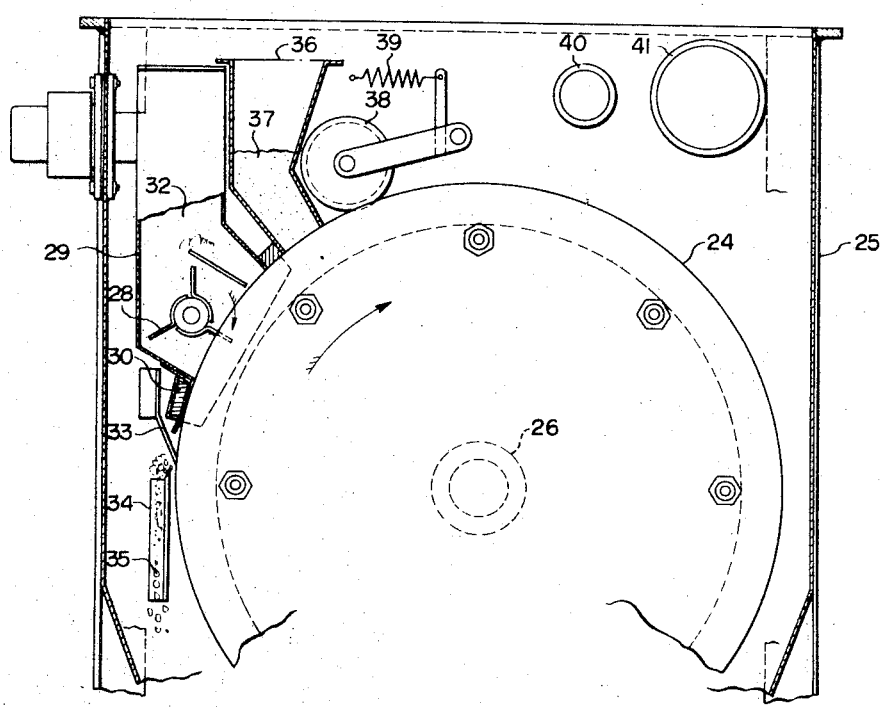
FIGS. 13 and 14 are respectively an elevational end view and a plan view, both partially in section and with parts cut away, showing an embodiment of the filter according to the invention capable of accomplishing continuous filtration by application of the flushing theory of the invention.
Figure 14:
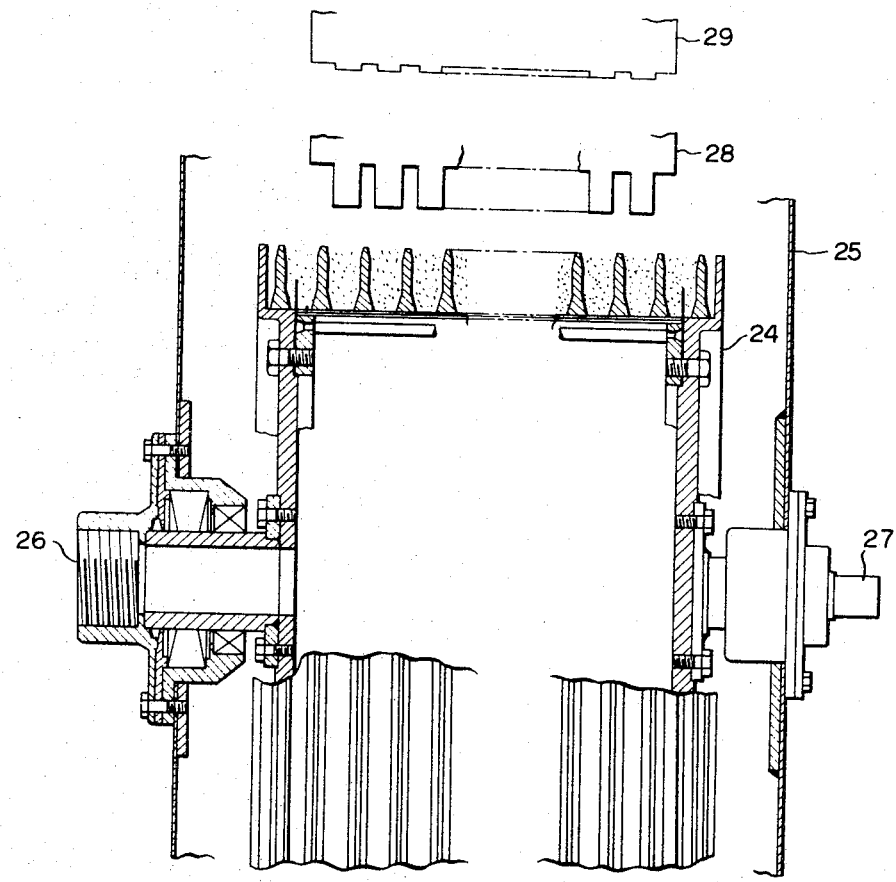

Referring to FIGS. 13 and 14, the filter shown therein has a cylindrical filter element assembly 24 disposed horizontally within a tank 25 and supported by a filtrate outlet 26 and a driven shaft 27. The filter element assembly is provided close to its peripheral surface with a washing device comprising a casing 29 for wash liquid, a rotor 28 disposed within the casing 29 and provided with comb-shaped combing vanes, a permanent magnet 30 for shielding, and a wash liquid outlet 31. Filter element material undergoing washing is designated by reference numeral 32.

The asembly 24 is further provided at its peripheral surface with a filter surface scraper 33, a guide 24 for guiding falling foreign particles 35, a filter material hopper 36 containing filter material 37, and a roll 38 caused to compress the filter material by a force exerted by a spring 39. Reference numerals 40 and 41 respectively designate inlets for the wash liquid and the original liquid to be filtered.

This filter operates in the following maner. As the filtration proceeds, foreign particles progressively accumulate on the surface of the filter element assembly 24 and are scraped off by the scraper 33 as the assembly 24 is rotated, being then guided by the guide 34 to fall in the state 35 into the bottom of the tank 25. The foreign particles so collected at the bottom of the tank are then removed out of the tank by means such as, for example, a screw conveyor (not shown).

The part of the filter element assembly 24 so scraped then arrives at a position below the rotor 28, where the filter material particles on said part are combed off to an appropriate depth and are agitated and washed in the casing 29. The turbid liquid within the casing 29 is drawn away through the outlet 31 by a separately provided pump (not shown) and then returned again to the tank 25 through the inlet 40.

On one hand, the washed filter material particles again enter the filter element assembly 24 from the right-hand side (as viewed in FIG. 13) of the rotor 28. Since the unfiltered liquid in the tank is drawn in through the skirt edge part of the casing 29, the magnet device 30 is provided thereabout to restrain the filter material particles therebelow, thereby to function as a shield to reduce as much as possible the quantity of filter material drawn in.

The part of the assembly 24 so washed then reaches a position below the hopper 36, and, if there is a deficiency of filter material, the necessary quantity of said material is automatically replenished. Subsequently, the filter material is compressed by the roll 38 and thereby prepared for the following filtration operation.

The filter material particles are intended to be separated from the foreign particles in the casing 29 and returned to the filter element assembly, but if the aforementioned pump is excessively powerful, a portion of the filter material will be swept out together with the outflowing wash liquid to cause a deficit of filter material. By installing the inlet 40 to return the wash liquid into the hoppr 36, the filter material so swept away can be recovered, in which case the wash liquid overflows from the hopper into the tank 25.

Since the turbid wash water returned to the tank 25 through the inlet 40 contains particles with a rapid rate of settling because of the phenomenon in feature 5 set forth above, which particles accordingly settle rapidly to the bottom of the tank, the quantity of foreign particles suspended in the tank assume a balanced state at a certain point. Thus, the original unfiltered liquid is separated into the filtrate and foreign particles, and by removing these foreign particles out of the tank by means such as a screw conveyor, continuous filtration is accomplished. The above described technique and means are suitable for a filter element assembly of the magnetic yoke type.

Figure 15:
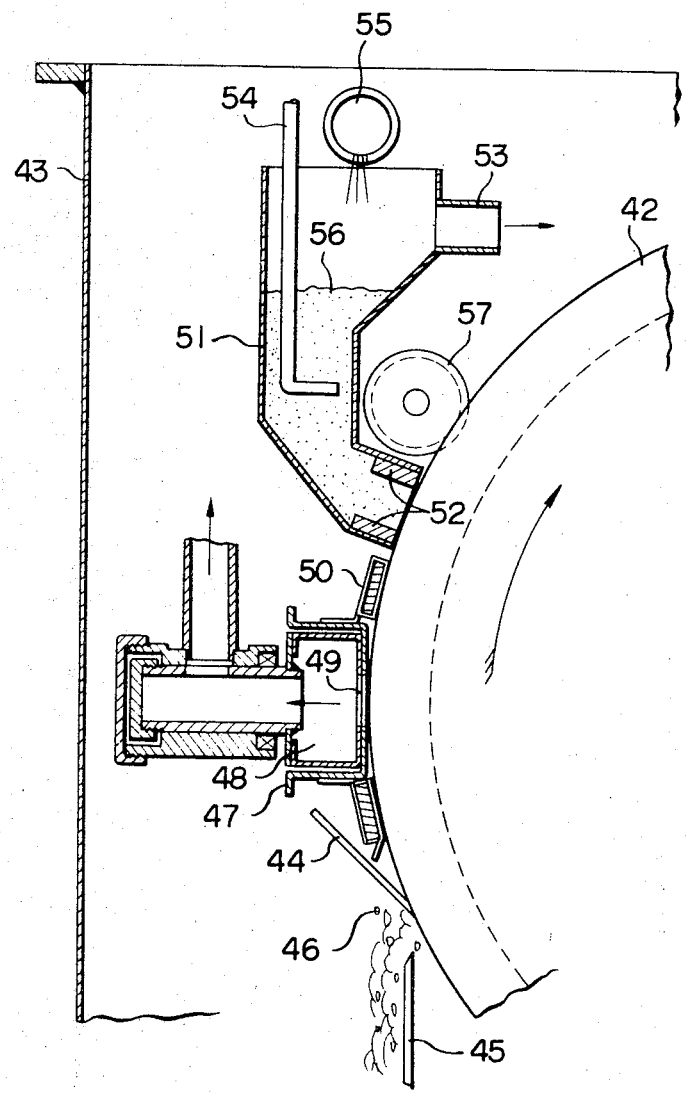
FIGS. 15 and 16 are respectively partial, and elevational and side elevational views, partly in section and with parts cut away, illustrating a method and means for washing the entire surface of the filter element assembly by means of a suction device that traverses said surface.
Figure 16:
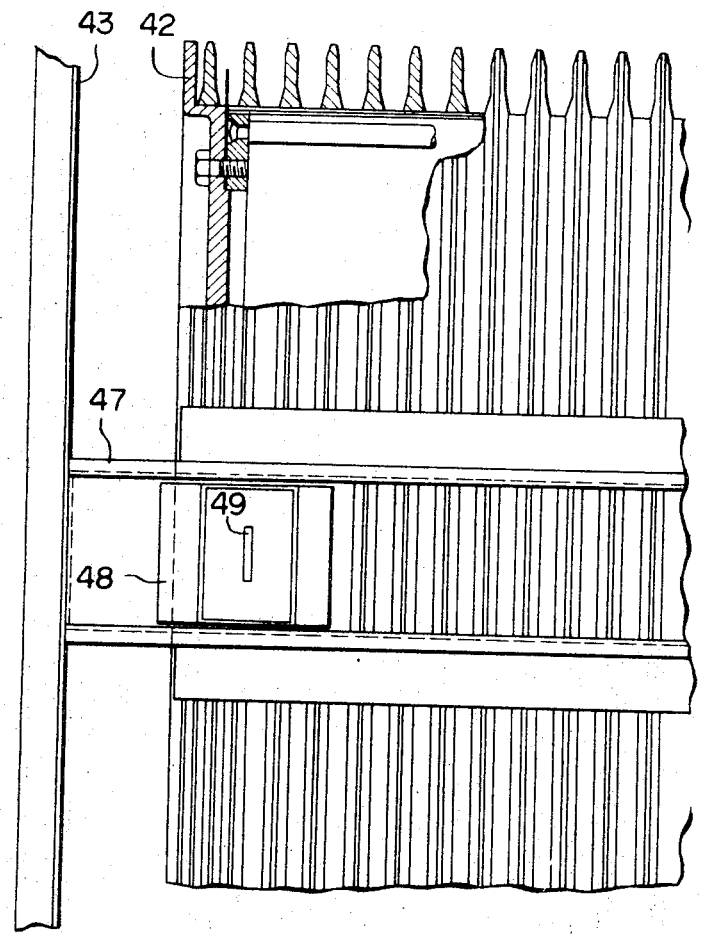

A second technique will now be described with respect to an example as illustrated in FIGS. 15 and 16. In this filter, a cylindrical filter element assembly 42 is rotatably supported in a horizontal disposition within a tank 43 and is provided at its peripheral surface with a surface scraper 44, a guide 45 for foreign particles 46 scraped off by the scraper 44, a suction device having a guide 47 disposed to contact the filter element assembly 42 and fixed at its two ends to the walls of the tank 43, a filter material hopper 51, and a roll 57 for compressing the filter material.

In the above mentioned suction device, a small case 48 of the suction device having a suction slot 49 in its wall to confront the filter element assembly 42 is slidably supported within the guide 47 to slide horizontally across the width of the assembly 42. The guide 47 is further provided at its skirt edge part with permanent magnets 50 to function as shields.

The hopper 51 is provided at its lower outlet with a permanent magnet 52 which functions to regulate the quantity of filter material passing out and at its upper part with an outlet 53 for wash liquid. A leveling member 54 which undergoes reciprocating movement across the width of the filter element assembly 42 together with the case 48 of the suction device extends into the filter material 56 within the hopper 51 and operates to level the height of said material 56. An inlet 55 is provided to return wash liquid into the hopper 51.

The above described parts operate in the following manner. As the filter element assembly 42 rotates in the arrow direction as it carries out filtration, the foreign particles which have accumulated on the surface thereof are scraped off by the scraper 44 and fall along the guide 45. Then, when the part of the surface of the assembly 42 which has been so scraped subsequently reaches a position confronting the suction slot 49, the foreign particles which have infiltrated into the interior of the filter material are drawn together with filter material particles into the case 48.

For this operation, the rotational speed of the filter element assembly 42 is so adjusted that the filtration pressure is limited to a maximum value of approximately 0.3 kg./cm.$^2$. (With a pressure of this order, the liquid, in the case of water, can be filtered at a rate of 20 cc./cm.$^2$/min. or higher.)

The suction pressure is then set at approximately 0.5 kg./cm.$^2$ to draw off a small quantity of the filtrate from the interior of the filter element assembly 42 and send this filtrate into the filter material. The reason for the use of a single suction slot 49 to traverse the entire filter surface is that, by this technique, every portion of the filter surface can be backwashed in turn to accomplish thorough washing of the filter material particles. If a large area of the surface were to be backwashed at one time, some incompletely washed parts would result. The filter element assembly 42 is rotated intermittently by means of a ratchet mechanism (not shown), and during each pause in the intermittent rotation the suction device is caused to undergo reciprocating sliding movement, whereby, with a single suction slot, the entire filter surface can be thoroughly traversed.

The wash water leaving the suction device passes through a pump (turbid water pump, not shown) and is returned through the inlet 55 into the hopper 56, where the filter material particles in the wash liquid, being relatively large and of high specific gravity, rapidly fall downwardly, while the foreign particles are discharged together with the wash water into the tank 43.

The leveling member 54 repeatedly reciprocates in the hopper 51 to level the height of the filter material 56. In this manner, the filter material travels from the filter element assembly, through the pump and hopper, and back to the filter element assembly. The foreign particles collected at the bottom of the tank are removed to the outside as described hereinbefore. The above described technique and means are suitable for cases wherein the foreign particles to be removed are relatively fine.

Figure 17:
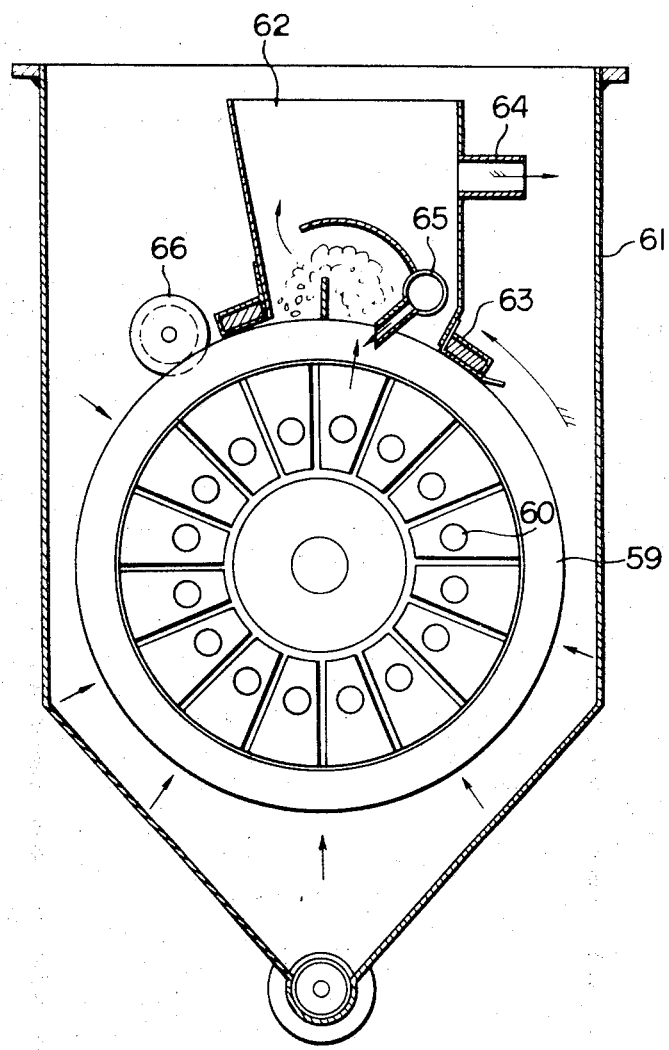
FIGS. 17 and 18 are respectively end elevational and partial side elevational views, in section, illustrating a method and means for supplying a portion of the filtrate to the filter material to wash this material.
Figure 18:
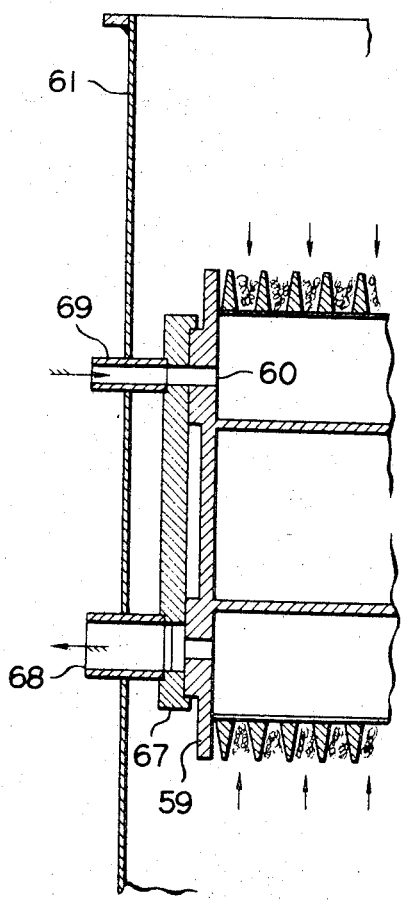
Figure 19:
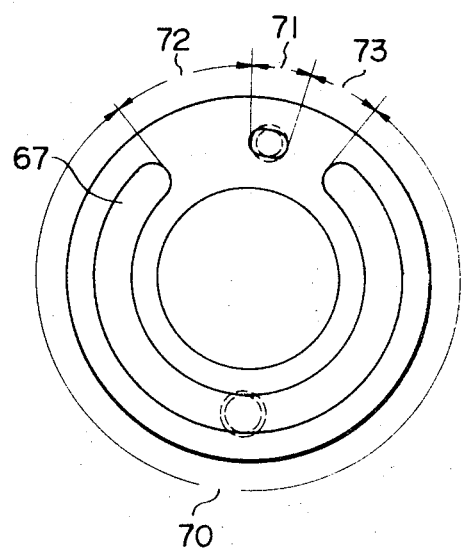
FIG. 19 is an end view illustrating a slide valve suitable for use with the means shown in FIGS. 17 and 18.

In still another embodiment of the invention as shown in FIGS. 17, 18, and 19, a filter element assembly 59 of cylindrical form having wedge-shaped particle accommodating spaces is rotatably supported in a horizontal position within a tank 61 and has an interior structure which is divided into a large number of separate chambers into which the filtrate is conducted. Each of said chambers is provided with a port 60 communicating with a slide valve 67 as indicated in FIG. 18. Above the filter element assembly 59, there is provided a casing 62 for washing of the filter material having, at its skirt edge part close to said assembly, permanent magnets 63 for shielding and, at its upper part, an outlet 64 for wash liquid. Within the casing 62, there is provided a pipe assembly including for each wedge-shaped space an inlet pipe 65 which protrudes into the filter material on the peripheral part of the assembly 59 to function as a plough to loosen firmly compacted filter material. Depending on the necessity, this pipe assembly is utilized to inject filtrate therethrough to wash the filter material. A roll 66 is provided as in the preceding examples to compress the filter material.

The slide valve 67, as shown in planar view in FIG. 19, is of disk shape and is disposed between one end face of the filter element assembly 59 and a filtrate outlet 68 and an inlet 69 for filtrate for washing. As shown in FIG. 19, the slide valve 67 is provided with an arcuate slot of angular extent 70 for taking out filtrate from the chambers of the filter element assembly and a short arcuate slot of angular extent 71 for introducing filtrate for washing, the angular extents of parts of the valve corresponding to no draw-off of filtrate before and after washing of the filter material being designated by reference numerals 72 and 73.

The filter of the above description operates in the following manner. When a port 60 for filtrate is coinciding with the slot of angle 70, the filtrate within the corresponding chamber flows out, but when the port 60 coincides with the region designated by 73, the filtration within that chamber is closed off. When the port 60 coincides with the slot of angular extent 71, filtrate is delivered in reverse through the inlet 69, and the corresponding filter material is backwashed. At the same time, the filter material is ploughed and loosened by the pipe 65 and is effectively washed even when it has been firmly compacted.

The washed filter material again enters the filter element assembly 59 at the left-hand side (as viewed in FIG. 17) of the casing 62 and is compressed by the roll 66, whereupon the washing of the filter material is completed. The contaminated liquid containing foreign particles is discharged through the outlet 64 into the tank 61. Thereafter, the operation is the same as that described above with respect to the preceding examples.

By selecting an appropriate technique from among the techniques described above with respect to three examples, a liquid containing a large quantity of almost any kind of foreign matter can be filtered efficiently and continuously.

It should be understood, however, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What I claim is:

1. In a filter construction, the improvement comprising a plurality of pairs of spaced magnetic pole surfaces the facing surfaces of each pair, respectively, being disposed in converging relation with reference to the flow direction of liquid to be filtered, a body of filter material particles selected from the group consisting of magnetizable particles and an admixture of magnetizable particles and non-magnetizable particles, said body of filter material being confined between said surfaces in response to magnetic force, and screening means at the ends of said pairs of pole surfaces where the space between the respective surfaces of a pair is the narrowest.

2. In a filter construction as claimed in claim 1, and means to wash one portion of the body of filter material at a time comprising a housing element adapted to be placed in juxtaposition with the outermost surfaces of such pole pieces, magnetic means surrounding said housing element, means to apply agitating action on the body of filter material particles within the sphere of influence of said magnetic means in a direction transverse to the direction of flow of the liquid to be filtered, and means for effecting relative movement between said pole surfaces and said last-mentioned magnetic means and the means to apply agitating action.

3. A filter construction comprising parallel pairs of annular magnetic pole elements having inclined surfaces in converging relation, a filtrate outlet in the interior of said pole elements, a body of filter material particles selected from the group consisting of magnetizable particles and a mixture of magnetizable particles and non-magnetizable particles magnetically confined between the surfaces of the pairs of pole surfaces, means for causing liquid to be filtered to be confined in contact with the periphery of said pole elements so that the liquid in filtering flows to the interior space within said pole elements, a housing element in juxtaposition with the outermost surfaces of such pole pieces, magnetic means surrounding said housing element, means to apply agitating action on the body of filter material particles within the sphere of influence of said magnetic means in a direction transverse to the direction of flow of the liquid to be filtered, and means for effecting relative movement between said pole surfaces and said last-mentioned magnetic means and the means to apply agitating action.

4. In a filter construction, a tank, means to supply liquid to be filtered to said tank, a rotary filter unit within the tank including parallel pairs of annular magnetic pole surfaces, the surfaces of each pair being spaced relative to one another and having portions in converging relation at least at the inner ends thereof, screen means underlying all said pole elements, means supporting said elements for rotation, a body of filter material particles selected from the group consisting of magnetizable particles and a mixture of magnetizable particles and non-magnetizable particles confined between the surfaces of the respective pairs of pole surfaces, wall means defining at least one chamber on the interior of said pole elements, means for withdrawing filtered liquid from said chamber, a housing element supported in juxtaposition with the outer periphery of at least a portion of said pole surfaces, a magnet surrounding said housing element and also in juxtaposition with the outer periphery of the underlying portions of the pole surfaces, means within said housing element for applying agitating action to the particles underlying said housing element, means to effect a backwash current from said chamber into said housing element, and further means to replenish any particles withdrawn during such backwashing.

References Cited

UNITED STATES PATENTS

| 1,975,109 | 10/1934 | Laughlin et al. | 210—223 X |
| 2,066,479 | 1/1937 | MacIsaac | 210—75 |
| 2,125,846 | 8/1938 | Laughlin | 210—223 X |
| 2,292,861 | 8/1942 | Asch | 210—222 |
| 2,302,449 | 11/1942 | Laughlin. | |
| 2,302,450 | 1/1942 | Laughlin | 210—290 X |
| 2,936,893 | 5/1960 | Arkoosh et al. | 210—223 |

FOREIGN PATENTS

| 673,688 | 10/1929 | France. |
| 838,582 | 9/1952 | Germany. |

REUBEN FRIEDMAN, *Primary Examiner.*

F. MEDLEY, *Assistant Examiner.*